Oct. 10, 1939.    L. W. CARMODY ET AL    2,175,427
TRACTOR HITCH
Filed Aug. 4, 1938    3 Sheets-Sheet 1
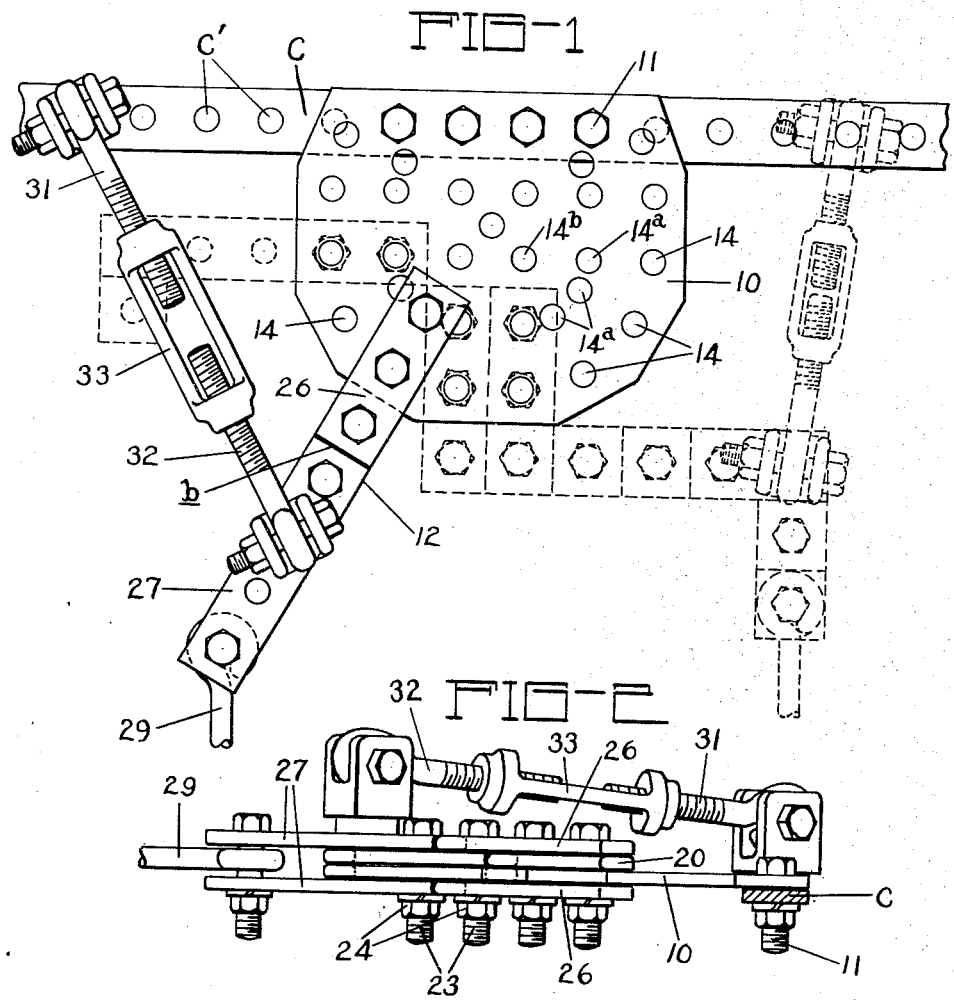
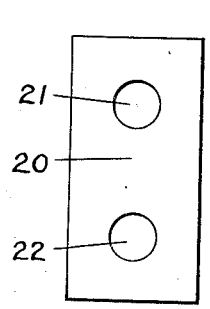
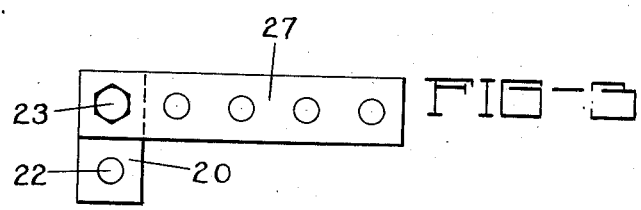
Inventors
Leonard W. Carmody and
Samuel M. Campbell,
By Walter N. Haskell
Their Attorney

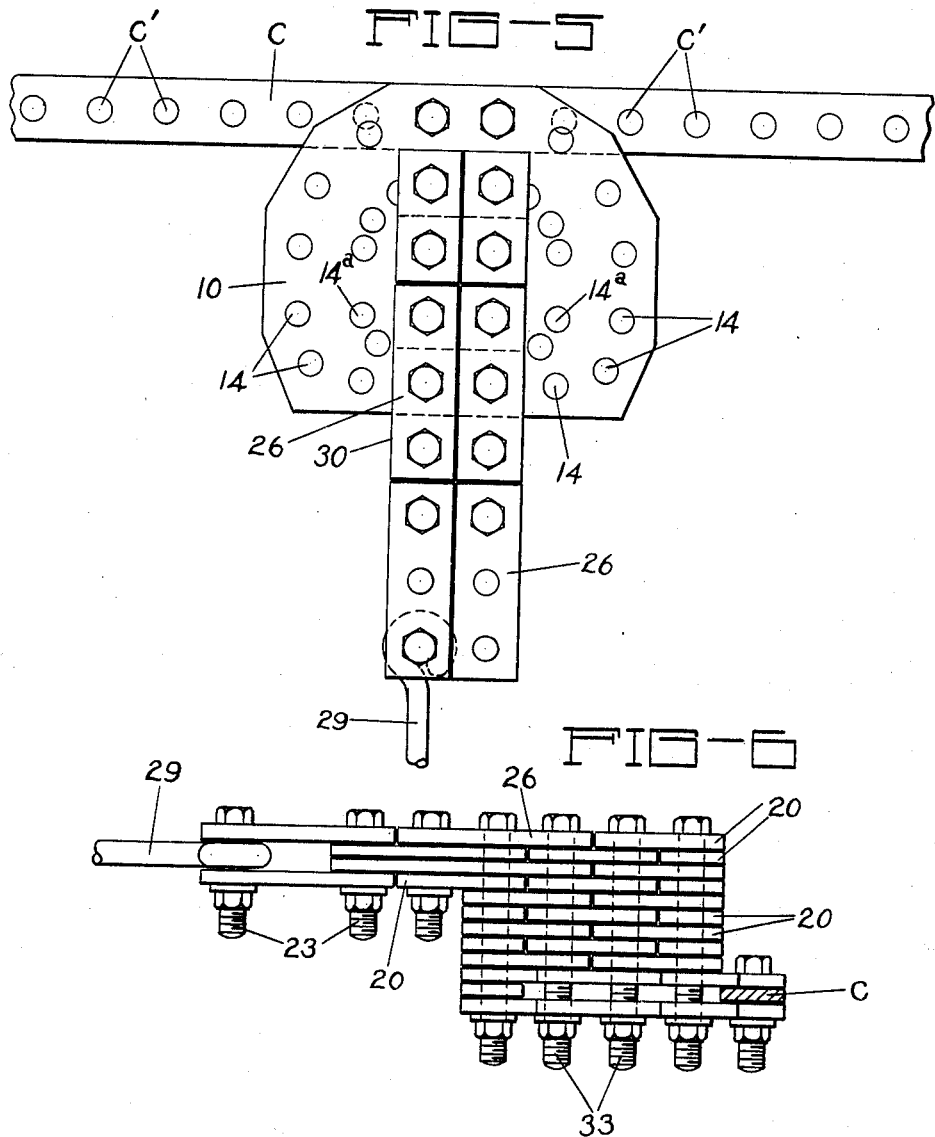

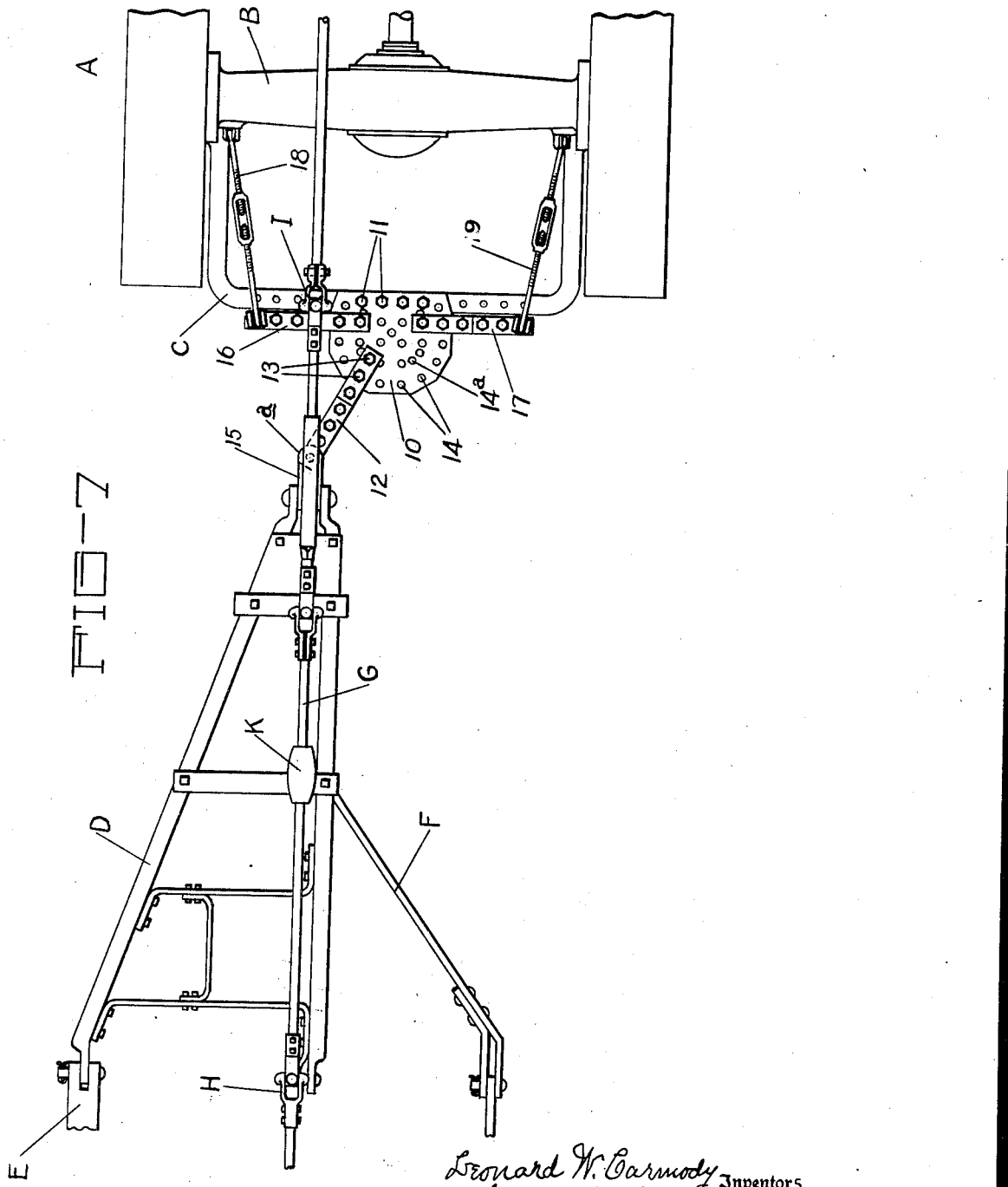

Patented Oct. 10, 1939

2,175,427

UNITED STATES PATENT OFFICE 2,175,427

TRACTOR HITCH

Leonard W. Carmody and Samuel M. Campbell,
Rock Island, Ill.

Application August 4, 1938, Serial No. 222,988

4 Claims. (Cl. 280—33.44)

Our invention has reference to a tractor hitch, of the type set forth in the co-pending application of said Leonard W. Carmody, filed Nov. 18, 1937, Serial No. 175,257. The chief purpose of the invention is to provide a hitch of a universal type, by means of which connections can be made between a tractor and different kinds of machines. Under present conditions it is found to be necessary to provide a great number of hitches of different shapes and styles, and to provide for changes in the relative positions of a tractor and trailer device, not only when moving straight ahead, but when turning corners and the like. Occasionally a supply of such hitches kept on hand by a dealer in farm implements will not serve the purpose, and a hitch must be specially made, at a considerable expense. This frequently interferes with the sale of a tractor, or machine.

In the present invention the desired results are secured by means of a master-plate adapted for connection with a tractor, and a hitch-bar secured to the master-plate at one of its ends and to the vehicle that is being drawn by the tractor at its other end. The hitch-bar is built up of a number of unitary plates, with all parts interconnected so as to form a single rigid bar or plate. The connecting means consist of bolts passing through openings in the plates, which are arranged for use in pairs, with the centers of each pair of openings equi-distant from each other, so that the parts can all be fitted together like match-work. By the means mentioned it is possible to build out at the rear of the master-plate, or to the side thereof, so as to bring a tractor and machine into proper alignment, and also to build upwardly or downwardly so as to compensate for differences in the heights of the tractor and machine. Means is also provided for bracing the parts, and taking the strain off of the hitch in going around corners and the like.

By means of the invention it is possible for a mechanic to take a number of the plates to a place where a tractor and machine are located, and construct a hitch at once suited to such pieces of mechanism.

In the drawings—

Fig. 1 is a plan view of the invention, in one of its adaptations.

Fig. 2 is an edge view thereof.

Fig. 3 is a detail of construction of one of the hitch-bars.

Fig. 4 shows one of the plates 20 detached.

Fig. 5 is a view similar to Fig. 1, with a change in the arrangement of parts.

Fig. 6 shows a construction of a hitch to provide for a variation in the heights of a tractor and machine to be drawn thereby.

Fig. 7 is a plan view of fragmentary parts of machines connected by a hitch made according to the invention.

Referring first to Fig. 7 of the drawings, the letter A refers generally to the fragmentary portion of a tractor, having an axle housing B, and draw-bar C. D is a frame shown connected with a fragmentary part E of a piece of machinery to be drawn by the tractor, which frame is provided at one side with a brace F, further connecting the frame and machine. The machine may be of the power driven type, and a power shaft is indicated at G, provided with universal joints at H and I, and with a slip-joint at K. These joints provide for a limited amount of flexibility to the shaft when the tractor deviates from a straight line. The foregoing parts are included for illustration only, it being understood that changes can be made therein, and other types of machine or tractor substituted therefor.

At 10 is shown a master-plate, of heavy sheet metal, connected with the draw-bar C by bolts 11, passing through openings in said plate and corresponding openings provided in the bar C as at C'. Fixed to the plate 10 is a bar 12, by means of bolts 13 passing through one pair of openings 14 and 14ª in the plate 10. The other end of the bar 12 is pivotally connected as at $a$ with a coupling 15 connected with the end of the frame D. Other bars 16 and 17 are shown extended laterally from the plate 10, and connected by braces 18 and 19 with parts of the tractor frame.

The hitch bars are made up of a number of unitary plates, such as is shown at 20 in Fig. 4, and provided with pairs of openings 21 and 22, to receive bolts 23 or fasteners of a similar character by means of which the plates are rigidly united, and provided with nuts 24 on their threaded ends. Lapping plates or splicers 26 are also used, containing an extra bolt opening, and still longer plates may be used, as at 27.

The plate 20 is of a double square formation, the length of such plate being double its width, and approximately two inches in width to four in length, with the openings 21 and 22 centrally of the squares. The centers of said openings in all of the plates 20 are equi-distant from each other, and the same is true of the splicers and other long plates, the openings in which will register with those in the shorter plates. All of the plates can thereby be interconnected and interlocked, forming a solid bar. The openings shown in the master plate 10 at 14 and 14ª are similarly spaced, so that the plates can be readily connected therewith. Additional openings 14ᵇ are also provided, (Fig. 1) for use with longer plates, if needed.

The hitch-bars can be formed of any length, to suit the particular need, and the ends of the plates forming the bar are in contact with each other, as at g in Fig. 1 forming a rigid, unbendable bar. For extra strength the bar can be of double formation, as shown at 30 in Fig. 5. In this figure the master-plate is shown reversed in position, with its wider edge to the rear, and giving greater possibilities in the process of connecting hitches thereto. In case an angle is formed in a bar, as in Fig. 3, the parts thereof will be held at a right angle with each other by the connecting plates, with the side edges of some of the plates in contact with the end edges of other plates, with the angle rigidly formed. The master-plate 10 can also be formed of two or more of such plates, either face to face or with intervening plates between. The strength of the master-plate can thereby be more than doubled.

In Fig. 1 the bar 12 is shown connected with the draw-bar C by a brace formed of rod sections 31 and 32, with a turnbuckle connection therefor at 33. Other methods for forming side connections are also shown in broken lines in said figure. These provide for connections with a trailing machine at one side or other of the center line of the tractor, or of the power shaft thereof. This gives a greater spread to the connections, and less danger of interference with the power shaft when the tractor and machine are moving at an angle to each other.

In Fig. 6 is shown a structure the purpose of which is to compensate for the difference in height between the draw-bar of a tractor and frame of the machine to be drawn, which consists in building up by means of the plates from the level of the draw-bar, indicated at C to the point of connection with a machine, as by a rod 24. This provides a hitch-bar of a thickness equalling the variation in the heights of the two machines, and is preferably of double formation, as in Fig. 5, with bolts of sufficient length to unite all of the plates. In the same manner the hitch-bar can be built downwardly from the draw-bar to the machine.

All of the plates used in the hitch-bars are of approximately one-half inch in thickness, with two of such plates face to face giving an additional inch spacing. By making an estimate of the variation between the two points, the number of plates required to fill the same can be easily estimated. Metal strips of the width and thickness required for the plates are commonly kept in stock, and the plates can be cut therefrom and provided with the openings for the bolts by a simple punching process.

As before mentioned, a number of the plates and bolts can be kept on hand, and the hitch bars built up therefrom to supply the need. By this means different types of tractors can be hitched up with different kinds of machines with little trouble and expense. In some cases the master-plate can be dispensed with, and connections made by a hitch-bar directly from the tractor to a machine, with a brace to help hold the bar in place.

What we claim, and desire to secure, is:

1. A device of the class described, comprising a master-plate, adapted for attachment to the draw-bar of a tractor, provided with a plurality of bolt openings arranged in equidistant pairs, a hitch-bar formed of a plurality of unitary plates, provided with similarly spaced openings, and bolts fastening said plates to each other and to said master-plate.

2. A device of the class described, comprising a master-plate adapted for attachment to the draw-bar of a tractor, provided with a plurality of bolt openings arranged in equi-distant pairs, a hitch-bar formed of a plurality of unitary plates, provided with similarly spaced openings, bolts fastening said plates to each other and to said master-plate, and a brace connected with said hitch-bar and attachable to the frame of the tractor.

3. A device of the class described, comprising a master-plate adapted for attachment to the draw-bar of a tractor, and provided with bolt openings arranged in pairs with predetermined spacings, a draw-bar formed of unitary plates of a prescribed size, provided with pairs of bolt openings with spacings corresponding with those first mentioned, and bolts for said openings fastening said plates together and to said master-plate.

4. A device of the class described, comprising a master-plate, adapted for attachment to the draw-bar of a tractor, and provided with a plurality of bolt openings arranged in regular pairs with the pairs disposed in different directions, a hitch-bar formed of a plurality of unitary plates provided with pairs of openings corresponding with each other and with said first named openings, and bolts connecting said plates with each other in overlapping series, and connecting said plates with said master-plate.

LEONARD W. CARMODY.
SAMUEL M. CAMPBELL.